UNITED STATES PATENT OFFICE.

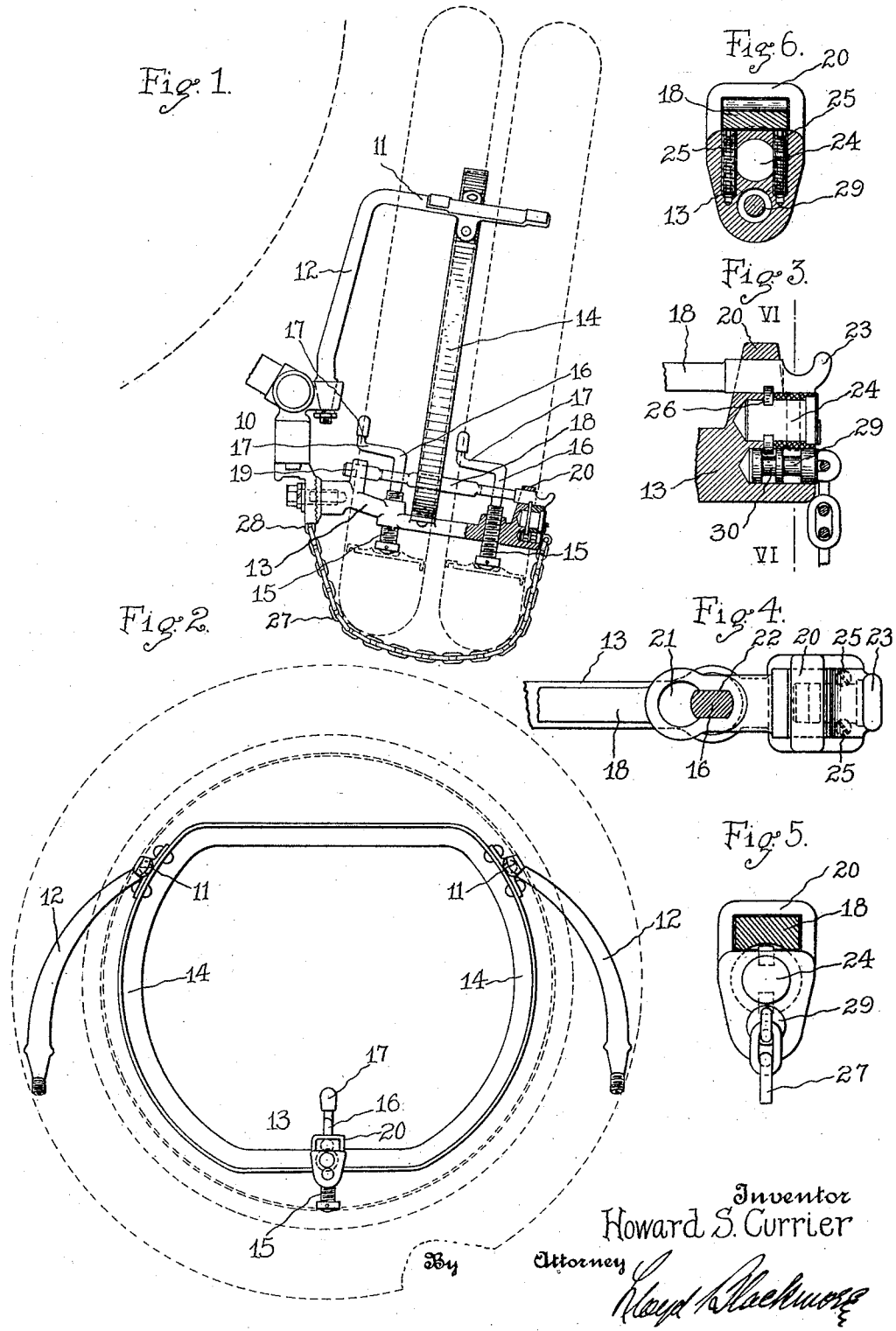

HOWARD S. CURRIER, OF DETROIT, MICHIGAN, ASSIGNOR TO GENERAL MOTORS CORPORATION, OF DETROIT, MICHIGAN, A CORPORATION OF DELAWARE.

MOTOR-VEHICLE.

1,399,379.             Specification of Letters Patent.           Patented Dec. 6, 1921.

Application filed April 5, 1919. Serial No. 287,753.

*To all whom it may concern:*

Be it known that I, HOWARD S. CURRIER, a citizen of the United States, and resident of Detroit, Wayne county, State of Michigan, have invented certain new and useful Improvements in Motor-Vehicles, of which the following is a specification.

My invention relates to tire carriers designed to support spare tires at the rear end of an automobile body, and particularly to tire carriers adapted to support one or more assembled tires and rims by means of supporting members or supporting means located within a rim supported by the device, and which supporting means engages with the inner surface or portion of the rim or rims supported by the carrier, the tires being in place upon the rims and supported thereby.

The object of my invention is to provide a tire carrier having improved locking means for preventing the surreptitious removal of the rim and tire from the carrier, or of the tire from the rim without the actual removal of the rim from the carrier whereby it is directly supported, the invention including improved means for locking the rim and, to a certain degree, the tire in place upon the carrier whereby the two are supported, as well also as means for locking the tire in such a way as to prevent its removal from the rim, the rim and tire locking mechanisms being functionally independent of one another and capable of use each apart from and without the other, although both said locking means are preferably used together in a single tire supporting device or tire carrier made in accordance with my invention.

With the above and other objects of invention in view, my invention consists in the improved tire carrier illustrated in the accompanying drawing and hereinafter described and particularly claimed, and in such variations and modifications thereof as will be obvious to those skilled in the art to which my invention relates.

In the drawing accompanying and forming a part of this specification and wherein the preferred embodiment of my invention is illustrated:

Figure 1 is a view showing my improved tire carrier in side elevation;

Fig. 2 is a view showing the same in end elevation;

Fig. 3 is a view upon a larger scale showing the elements immediately concerned with the locking and unlocking of the locking members for the rim and for the tire supported by the carrier;

Fig. 4 is a view showing certain parts of the locking mechanism for the most part in plan;

Fig. 5 is a similar view showing parts of the locking mechanism in end elevation; and, Fig. 6 is a view showing a section upon a transverse plane indicated by the line VI—VI, Fig. 3.

Referring now to the drawing, the two tires and rims shown in dotted lines in Figs. 1 and 2 are supported by rim supporting means located within the rims when the tires and rims are in place upon the carrier, and which supporting means engages with the inner surface or inner portion of the rims at points spaced apart from one another to thereby afford support thereto, the means whereby the rims are immediately supported being in turn supported from the rear end of an automobile body in any way and through any suitable supporting device such, for example, as a bracket structure shown conventionally, and designated as a whole by the reference numeral 10.

The rim supporting means illustrated comprises two supporting members or elements 11 spaced apart from one another and formed at the upper ends of standards 12 the lower ends of which are supported in any way as by the bracket structure whereby the entire carrier is supported, and which supporting members or elements 11 engage with the inner surface or portion of each rim supported by the carrier at points adjacent the upper end or portion thereof, as shown, together with an arm 13 supported by the main supporting bracket structure 10 and extending therefrom, and which arm is located adjacent the lower end of the rim supported by the carrier. The bent upper ends of the standards 12 which provide the rim supporting elements 11, and the arm 13, are connected together by and through a suitable frame 14 which lies within the rims of tires and rims supported by the carrier, as illustrated, whereby the elements immediately involved in the support of the rims are held in proper position relative to one another and a stiff and rigid tire supporting structure or device is secured.

The reference numerals 15 designate screws operating in threaded openings provided in the arm 13 and the axes of which extend substantially radially relative to the rims supported by the carrier, two such screws being present in the tire carrier illustrated as it is designed to support two tires and rims, although the carrier may obviously be designed to support one only, or more than two rims and tires.

The lower free ends of the screws 15 engage the inner surfaces or portions of the rims supported by the carrier, and the upper shank portions 16 thereof have handles 17 connected with them whereby the screws may be rotated, from which it follows that when the said screws are screwed downwardly their lower ends will engage the lower portions of the rims and force the entire rims downward, thus drawing the upper ends of the rims into firm engagement with the supporting arms or members 11 and securely holding the rims in place, the proper relative positions of the supporting elements 11 and of the arm 13 being maintained by the frame 14, as will be understood.

The reference numeral 18 designates a locking member or bar movable into two extreme positions in one of which it acts to prevent the screws 15 from being operated, while in the other it does not interfere with the screws, and they may therefore be rotated by their handles as hereinbefore explained. In the embodiment of my invention illustrated this locking member or bar is itself supported by the arm 13, and is slidable in bearings 19, 20 located adjacent the fixed and the free ends thereof, and the shanks 16 of the screws extend through openings in the said locking bar, see Fig. 4, one portion 21 of each of which openings is of such a size as to permit the screws to rotate without interference by the bar, while another portion 22 of the openings is of such a form and size as to interlock with the shanks which are flattened or otherwise shaped to correspond with the locking portions of the openings, to thereby prevent the screws from being operated.

When the locking bar is in the position in which it is shown in Fig. 4 the screw shown, and likewise the other screw, is locked against rotation and the screws cannot be operated to release the rims and permit their removal, while when the said bar is moved to the right by means of the handle 23 thereof the non-locking portions 21 of the openings through which the shanks extend are brought into positions such that the screws may be operated either to clamp the rims to the means aforesaid for holding them in place upon the carrier, or for releasing the rims so that they may be removed from the carrier.

The locking bar 18 is itself locked in the position in which it prevents rotation of the screws 15 by a rotatable cylindrical lock 24 housed in a recess provided in the free end of the arm 13, and held therein by screws 25 which are covered by the end of the bar when it is in its locked position, so that the lock cannot be removed by unauthorized persons, the lock having a locking element shown as a cross-bar 26 the upper end of which is movable into and out of a groove provided in the under side of the locking member 18, as best shown in Figs. 3 and 5.

The locking mechanism above explained will lock the rims in place so as to prevent surreptitious removal thereof from the carrier, but not necessarily the tires which are upon the rims. In order to provide for the locking of the tires to the carrier a chain 27 is employed, one end of which is permanently secured as at 28 to a fixed support, as to the main supporting bracket 10 or structure whereby the carrier mechanism is supported, while the other end of said chain is detachably secured to a second fixed support after passing about the tires, as shown, preferably to the free end of the arm 13 which supports the screws and the movable locking member which coöperates therewith.

Preferably the free end of the chain is locked to the free end of the arm 13 by the same lock 24 which locks the locking bar 18, to which end the free end of the chain is connected with a shackle 29 adapted to enter a recess provided in the end of the said arm, and which shackle is provided with a groove 30 into which the lower end of the cross-bar 26 of the lock 24 enters simultaneously with the movement of the upper end thereof into the groove upon the under side of the locking bar 18 as hereinbefore explained. It therefore follows that the tires are locked to the rims as well as the rims to the carrier, and that neither may be removed without first unlocking the locking mechanisms, by means of a proper key fitting the single lock 24 whereby the locking function is provided for, as hereinbefore explained.

Having thus described and explained my invention, I claim and desire to secure by Letters Patent:

1. In a tire carrier of the class described, rim supporting means adapted to lie within a rim supported by the carrier and including a manually operable holding member adapted to engage the interior of a rim and hold it in place upon the carrier; a movable locking member adapted to lock said holding member in its holding position aforesaid; a chain adapted to extend about a rim upon the carrier and about a tire upon the rim, and one end of which chain is secured to a fixed support; and locking means adapted to secure the free end of said chain and to lock said locking member in its locking position.

2. In a tire carrier of the class described, rim supporting means adapted to lie within a rim supported by the carrier and including an arm; a screw arranged substantially radially relative to a rim supported by the carrier and operating in a threaded opening provided in said arm, and the free end of which screw is adapted to engage the interior of a rim; a movable locking member carried by said arm and adapted to lock said screw against rotation; and a lock adapted to secure said locking member in a position to prevent rotation of said screw.

3. In a tire carrier of the class described, rim supporting means adapted to lie within a rim supported by the carrier and including an arm; means carried by said arm and adapted to engage the interior of a rim to thereby hold the same in place upon the carrier; a movable locking member carried by said arm and adapted to engage said holding means to lock it in a definite position; a chain one end of which is fixedly secured and the length of which is such that it may extend about a rim and tire supported by the carrier; and locking means for securing said locking member and the free end of said chain in fixed locking positions.

4. In a tire carrier of the class described, rim supporting means adapted to lie within a rim supported by the carrier and including an arm; means carried by said arm and adapted to engage the interior of a rim to thereby hold the same in place upon the carrier; a movable locking member carried by said arm and adapted to engage said holding means to lock it in a definite position; a chain one end of which is fixedly secured and the length of which is such that it may extend about a rim and tire supported by the carrier; and a single locking member carried by said arm and adapted to lock the free end of said chain and said locking member in fixed locking positions.

5. In a tire carrier of the class described, rim supporting means adapted to lie within a rim supported by the carrier and including an arm; a screw arranged substantially radially relative to a rim supported by the carrier, and operating in a threaded opening provided in said arm, and the free end of which screw is adapted to engage the interior of a rim; a reciprocating locking member carried by said arm and adapted to lock said screw against rotation; and a lock carried by said arm and adapted to lock said locking member in position to prevent rotation of said screw.

6. In a tire carrier of the class described, rim supporting means adapted to lie within a rim supported by the carrier, and which rim supporting means includes an arm; a screw operating in a threaded opening in said arm and adapted to engage the inner surface of a rim to hold it in place upon the carrier; a locking bar slidable in bearings carried by said arm and having an opening through which said screw extends, and the forms of which opening and screw are such that said screw may rotate when said bar is in one position but will be prevented from rotating when said bar is in another position; and a locking member carried by said arm and adapted to lock said bar in the last mentioned position aforesaid.

7. In a tire carrier of the class described, rim supporting means adapted to lie within a rim supported by the carrier and so arranged as to engage the inner surface of the upper part of a rim, an arm arranged at the lower end of a rim supported by the carrier, a screw extending substantially radially relative to a rim supported by the carrier and operating in a threaded opening provided in said arm, and the lower free end of which is adapted to engage the inner surface of a rim, a movable locking member adapted when in one position to permit the rotation of said screw, and when in another position to engage said screw and prevent the same from being rotated, a chain one end of which is permanently secured to a fixed support located adjacent said arm, and a lock adapted to lock said locking member in said last mentioned position, and to detachably secure the free end of said chain to a fixed support.

8. In a tire carrier of the class described, rim supporting means adapted to lie within a rim supported by the carrier and so arranged as to engage the inner surface of the upper part of a rim, an arm arranged at the lower end of a rim supported by the carrier, a screw extending substantially radially relative to a rim supported by the carrier and operating in a threaded opening provided in said arm, and the lower free end of which is adapted to engage the inner surface of a rim, a movable locking member carried by said arm and adapted when in one position to permit the rotation of said screw, and when in another position to engage said screw and prevent the same from being rotated, a chain one end of which is permanently secured to a fixed support located adjacent one end of said arm, and a lock carried by said arm and located at the other and free end thereof and adapted to lock said locking member in said last mentioned position, and to detachably secure the free end of said chain to the free end of said arm.

9. In a tire carrier of the class described, rim supporting means comprising two standards the lower ends of which are suitably supported, and the upper ends of which are bent so as to lie within and support a rim at points spaced apart from one another by engagement with the inner surface of the rim adjacent its upper end, an arm located within and at the lower end of of a rim supported by the carrier, a frame whereby the bent upper ends of said standards and said arm are connected together, a screw arranged substantially radially relative to a rim supported by the carrier and operating in a threaded opening in said arm, and the lower free end of which screw is adapted to engage the inner surface of a rim, a movable locking member adapted when in one position to permit the rotation of said screw, and when in another position to engage said screw and prevent the same from being rotated, a chain one end of which is permanently secured to a fixed support located adjacent said arm, and a lock adapted to lock said locking member in said last mentioned position, and to detachably secure the free end of said chain to a fixed support.

10. In a tire carrier of the class described, rim supporting means comprising two standards the lower ends of which are suitably supported, and the upper ends of which are bent so as to lie within and support a rim at points spaced apart from one another by engagement with the inner surface of the rim adjacent its upper end, an arm located within and at the lower end of a rim supported by the carrier, a frame whereby the bent upper ends of said standards and said arm are connected together, a screw arranged substantially radially relative to a rim supported by the carrier and operating in a threaded opening in said arm, and the lower free end of which screw is adapted to engage the inner surface of a rim, a movable locking member carried by said arm and adapted when in one position to permit the rotation of said screw, and when in another position to engage said screw and prevent the same from being rotated, a chain one end of which is permanently secured to a fixed support located adjacent one end of said arm, and a lock carried by said arm and located at the other and free end thereof and adapted to lock said locking member in said last mentioned position, and to detachably secure the free end of said chain to the free end of said arm.

11. In a tire carrier of the class described, rim supporting means located within a rim supported by the carrier and acting to support the same by engagement with the inner portion of the upper end thereof, an arm located at the lower end of a rim supported by the carrier, a screw extending substantially radially relative to a rim supported by the carrier and operating in a threaded opening provided in said arm and the lower free end of which is adapted to engage the inner portion or surface of a rim, and which screw is provided with a shank and an operating handle, a reciprocating locking bar slidable in bearings carried by said arm and having an opening through which said shank extends, the form of said opening being such that the screw may rotate when the bar is in one position, but is locked against rotation by engagement between the walls of the opening and the shank when the bar is in another position, a rotatable lock housed in a recess provided in the free end of said arm, and having a locking element adapted to enter a groove in the said bar, and a screw for holding said lock in place, which screw is covered by the end of said bar.

12. In a tire carrier of the class described, rim supporting means located within a rim supported by the carrier and acting to support the same by engagement with the inner portion of the upper end thereof, an arm located at the lower end of a rim supported by the carrier, a screw extending substantially radially relative to a rim supported by the carrier and operating in a threaded opening provided in said arm and the lower free end of which is adapted to engage the inner portion or surface of a rim, and which screw is provided with a shank and an operating handle, a reciprocating locking bar slidable in bearings carried by said arm and having an opening through which said shank extends, means provided by said shank and the wall of said opening for locking said screw against rotation when said bar is in one position, a chain one end of which is secured to a fixed support adjacent the fixed end of said arm, and a lock for securing said bar in position to prevent rotation of said screw and the free end of said chain to the free end of said arm.

13. In a tire carrier of the class described, rim supporting means located within a rim supported by the carrier and acting to support the same by engagement with the inner portion of the upper end thereof, an arm located at the lower end of a rim supported by the carrier, a screw extending substantially radially relative to a rim supported by the carrier and operating in a threaded opening provided in said arm and the lower free end of which is adapted to engage the inner portion or surface of a rim, and which screw is provided with a shank and an operating handle, a reciprocating locking bar slidable in bearings carried by said arm and having an opening through which said shank extends, means provided by said shank and the wall of said opening for locking said screw against rotation when said bar is in one position, a chain one end of which is secured to a fixed support adjacent the fixed end of said arm, a shackle secured to the free end of said chain and adapted to enter a recess provided in the free end of said arm, and a rotatable lock housed in a recess in the free end of said arm and having a locking element adapted to lock said shackle in its recess, and to lock said bar in position to prevent rotation of said screw.

HOWARD S. CURRIER.